United States Patent
Takahashi

(10) Patent No.: US 11,511,357 B2
(45) Date of Patent: Nov. 29, 2022

(54) HORIZONTAL LATHE

(71) Applicant: FURUKAWA ELECTRIC CO., LTD., Tokyo (JP)

(72) Inventor: Tadashi Takahashi, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 484 days.

(21) Appl. No.: 16/535,347

(22) Filed: Aug. 8, 2019

(65) Prior Publication Data
US 2019/0358714 A1   Nov. 28, 2019

Related U.S. Application Data

(63) Continuation of application No. PCT/JP2018/000841, filed on Jan. 15, 2018.

(30) Foreign Application Priority Data

Feb. 15, 2017   (JP) .............................. JP2017-025565

(51) Int. Cl.
*C03B 37/018* (2006.01)
*B23B 31/20* (2006.01)
*C03B 37/014* (2006.01)

(52) U.S. Cl.
CPC ........ *B23B 31/20* (2013.01); *C03B 37/01486* (2013.01); *C03B 37/01884* (2013.01)

(58) Field of Classification Search
CPC ................... C03B 37/01486; C03B 37/01884
See application file for complete search history.

(56) References Cited

U.S. PATENT DOCUMENTS

| 1,700,837 A | * | 2/1929 | Reuen | B23B 23/04 |
| | | | | 82/150 |
| 4,347,069 A | * | 8/1982 | Haney | F16L 27/0816 |
| | | | | 427/237 |
| 4,516,787 A | | 5/1985 | Venable | |

(Continued)

FOREIGN PATENT DOCUMENTS

| CN | 2437453 Y | 7/2001 |
| CN | 1646439 A | 7/2005 |

(Continued)

OTHER PUBLICATIONS

International Search Report dated Apr. 17, 2018 in PCT/JP2018/000841 filed Jan. 15, 2018 (with English Translation).

(Continued)

*Primary Examiner* — Cynthia Szewczyk
(74) *Attorney, Agent, or Firm* — Oblon, McClelland, Maier & Neustadt, L.L.P.

(57) ABSTRACT

A horizontal lathe for manufacturing a porous optical fiber preform, the horizontal lathe being configured to hold and fix two opposite ends of a target in such a manner that a longitudinal direction of the target is a substantially horizontal direction, and cause the target to be rotated around an axis parallel to the longitudinal direction thereof as a rotation axis. The horizontal lathe includes a thermal expansion absorbing mechanism configured to absorb a change in dimension of the target, the change being due to thermal expansion of the target in a direction of the rotation axis.

2 Claims, 5 Drawing Sheets

(56) References Cited

U.S. PATENT DOCUMENTS

| | | | | |
|---|---|---|---|---|
| 4,791,841 | A * | 12/1988 | Pruvot | B23B 31/207 |
| | | | | 279/4.09 |
| 4,971,614 | A * | 11/1990 | D'Annessa | C03B 37/01884 |
| | | | | 118/730 |
| 5,167,420 | A * | 12/1992 | Gregory | C03B 23/0473 |
| | | | | 279/121 |
| 5,178,401 | A * | 1/1993 | Mannl | C03B 23/045 |
| | | | | 279/121 |
| 5,183,490 | A * | 2/1993 | Mikami | C03B 37/014 |
| | | | | 65/144 |
| 5,711,781 | A | 1/1998 | Lysson et al. | |
| 6,286,546 | B1 * | 9/2001 | Mueller | C03B 37/01884 |
| | | | | 137/580 |
| 2003/0107864 | A1 * | 6/2003 | Mazlout | H01L 21/687 |
| | | | | 361/234 |
| 2006/0288738 | A1 | 12/2006 | Ruzzier et al. | |
| 2007/0096403 | A1 * | 5/2007 | Shah | C03B 37/01486 |
| | | | | 428/428 |
| 2012/0238434 | A1 * | 9/2012 | Koike | C03B 19/1453 |
| | | | | 501/54 |
| 2014/0312579 | A1 * | 10/2014 | Sun | C03B 37/01884 |
| | | | | 279/43.9 |
| 2017/0361380 | A1 * | 12/2017 | Luce | B23B 23/045 |
| 2018/0079678 | A1 * | 3/2018 | Milicevic | C03B 37/01884 |

FOREIGN PATENT DOCUMENTS

| | | | | |
|---|---|---|---|---|
| CN | 102658499 | A | | 9/2012 |
| DE | 199 52 474 | C1 | | 3/2001 |
| JP | 59-097548 | A | | 6/1984 |
| JP | 62-218003 | A | | 9/1987 |
| JP | 63-084804 | A | | 4/1988 |
| JP | 05319850 | A | * | 12/1993 ....... C03B 37/01486 |
| JP | 2008-178956 | A | | 8/2008 |

OTHER PUBLICATIONS

Written opinion dated Apr. 17, 2018 in PCT/JP2018/000841 filed Jan. 15, 2018.
Chinese Office Action dated Jun. 3, 2021 in Chinese Patent Application No. 201880011586.8 (with unedited computer generated English translation), 13 pages.
Combined Chinese Office Action and Search Report dated Mar. 3, 2020, in Patent Application No. 201880011586.8 (with English translation), 14 pages.
Extended European Search Report dated Nov. 5, 2020 in European Patent Application No. 18754351.7, 7 pages.

* cited by examiner

US 11,511,357 B2

HORIZONTAL LATHE

CROSS-REFERENCE TO RELATED APPLICATION(S)

This application is a continuation of International Application No. PCT/JP2018/000841, filed on Jan. 15, 2018 which claims the benefit of priority of the prior Japanese Patent Application No. 2017-025565, filed on Feb. 15, 2017, the entire contents of which are incorporated herein by reference.

BACKGROUND

The present disclosure relates to a horizontal lathe for manufacturing a porous optical fiber preform.

In recent years, a progress has been made in size enlargement of glass optical fiber preforms in order to improve productivity. Glass optical fiber preforms are manufactured, for example, by a well-known method such as a vapor phase axial deposition (VAD) method, a modified chemical vapor deposition (MCVD) method, or an outside vapor deposition (OVD) method.

Among these methods, the OVD method is a method for manufacturing a porous preform to be used for a glass optical fiber preform, including: introducing combustible gas, combustion supporting gas, and raw materials for glass into a burner, thereby causing a flame hydrolysis reaction to generate glass particles; and depositing the glass particles radially around a target (base material) that is rotating. Patent Literature 1 discloses a mechanism configured to use a vertical lathe, which rotates a target while holding it such that a longitudinal direction thereof is the direction of gravitational force (vertical direction), and, by the function of preventing holding force reduction caused by a thermal expansion difference, correct and control changes in direction of porous glass formed on the outer circumference of the target.

In contrast, a horizontal lathe, which rotates a target such that a longitudinal direction of the target is a substantially horizontal direction, may be used for manufacture of a porous preform.

SUMMARY

According to an aspect of the present disclosure, a horizontal lathe for manufacturing a porous optical fiber preform, the horizontal lathe being configured to hold and fix two opposite ends of a target in such a manner that a longitudinal direction of the target is a substantially horizontal direction, and cause the target to be rotated around an axis parallel to the longitudinal direction thereof as a rotation axis, the horizontal lathe includes a thermal expansion absorbing mechanism configured to absorb a change in dimension of the target, the change being due to thermal expansion of the target in a direction of the rotation axis.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

The following describes a horizontal lathe according to embodiments of the present disclosure with reference to the drawings in detail. The following embodiments are not intended to limit the present disclosure. Identical or corresponding components have the same reference signs throughout the drawings, and redundant description thereof is omitted as appropriate. It needs to be noted that the drawings are schematic and that relative dimensions of components and the like are not necessarily to scale. The drawings may include parts the relative dimensions of which or the ratios between which are different from one drawing to another.

Figure 1:
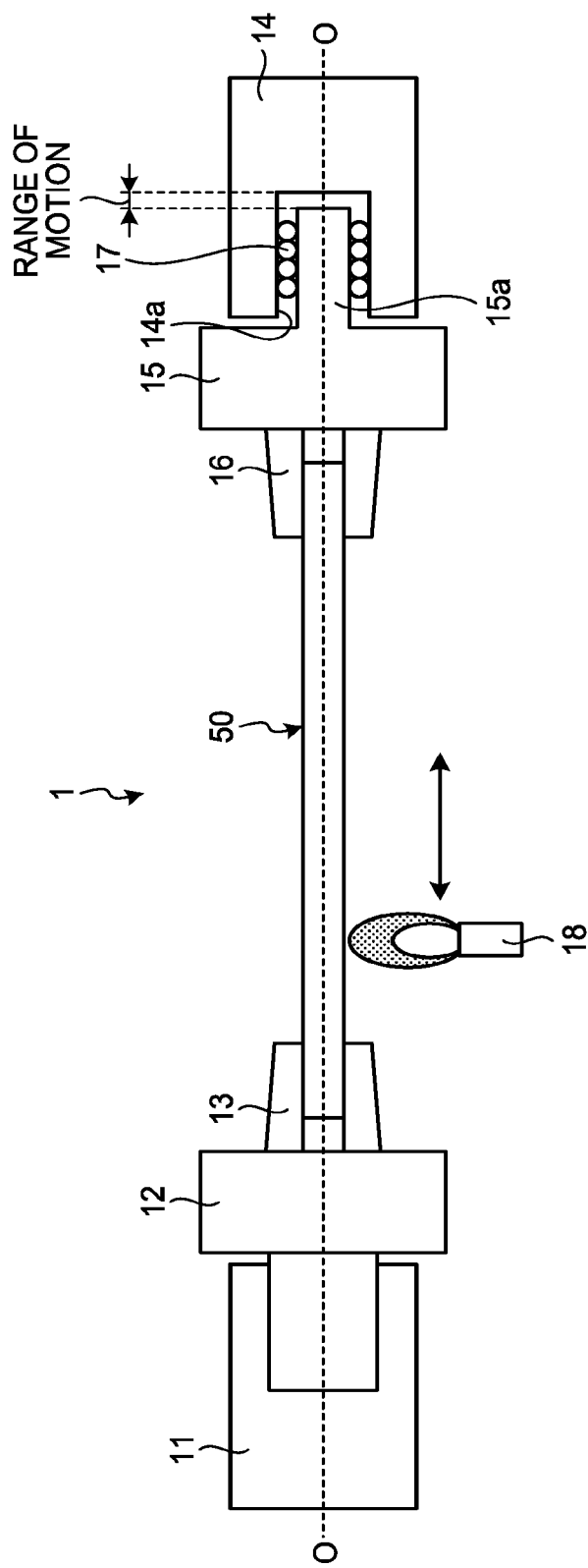
FIG. 1 is a side view illustrating a horizontal lathe according to a first embodiment of the present disclosure.

First, a horizontal lathe for manufacturing a porous optical fiber preform according to a first embodiment of the present disclosure is described. FIG. 1 is a side view illustrating the horizontal lathe according to the first embodiment.

As illustrated in FIG. 1, a horizontal lathe 1 according to the first embodiment includes a rotary motor 11, a fixed-side chuck block 12, a fixed-side chuck jaw 13, an axle receiving part 14, a movable-side chuck block 15, a movable-side chuck jaw 16, and a bearing 17.

The rotary motor 11 is configured to rotate the fixed-side chuck block 12 and the fixed-side chuck jaw 13 as a first chuck jaw about a rotation axis O. The fixed-side chuck jaw 13 is fixed to the fixed-side chuck block 12. The movable-side chuck jaw 16 is fixed to the movable-side chuck block 15.

The movable-side chuck block 15 has a protruding part 15a provided on one side thereof that is opposite to another side thereof on which the movable-side chuck jaw 16 as a second chuck jaw is provided. The cross section of the protruding part 15a perpendicular to the rotation axis O is, for example, substantially circular. The axle receiving part 14 has a recessed part 14a formed therein, the section of which perpendicular to the rotation axis O is, for example, substantially circular, so that the protruding part 15a can be inserted therein. The bearing 17 is made of, for example, a ball bushing and is provided between the inner circumferential surface of the recessed part 14a and the outer circumferential surface of the protruding part 15a. Thus, the movable-side chuck block 15 and the movable-side chuck jaw 16 are configured to be movable relatively to the axle receiving part 14 in the direction of the rotation axis O and freely rotatable about the rotation axis O.

The fixed-side chuck jaw 13 and the movable-side chuck jaw 16 are configured to hold opposite ends of a target rod 50 made of, for example, quartz glass, in such a manner that a longitudinal direction of the target rod 50 is parallel to a direction of the rotation axis O and is a substantially horizontal direction. When the rotary motor 11 is rotated with the fixed-side chuck jaw 13 and the movable-side chuck jaw 16 holding the respective opposite ends of the target rod 50, the target rod 50 as a target can be rotated about the rotation axis O.

In the horizontal lathe 1 thus configured, an oxyhydrogen burner 18 is configured to be able to deposit glass particles on the target rod 50 by flames and be movable relatively to the horizontal lathe 1 and the target rod 50 in the direction of the rotation axis O. Instead, the horizontal lathe 1 may be configured to be movable in the direction of the rotation axis O with the oxyhydrogen burner 18 fixed in a standing-still state. That is, the oxyhydrogen burner 18 may be configured to be movable relatively to the horizontal lathe 1 in the direction of the rotation axis O. The oxyhydrogen burner 18 may be further configured as appropriate to be able to retreat to a position at which the target rod 50 is not heated. The number of such oxyhydrogen burners 18 is not limited to one and can be two or more.

In a state before the target rod 50 is heated, the movable-side chuck block 15 and the movable-side chuck jaw 16 are movable in a range of motion that spans between a surface of the recessed part 14a, the surface facing the protruding part 15a, and a surface of the protruding part 15a, the surface facing the recessed part 14a. The length of the range of motion can be determined as appropriate in accordance with an elongated length of the target rod 50, which is to be heated, due to the thermal expansion thereof.

Next, deposition of glass particles on the target rod 50 is described. The target rod 50 is heated by flames of the oxyhydrogen burner 18 while being driven by the rotary motor 11 to rotate with the respective opposite ends of the target rod 50 held by the fixed-side chuck jaw 13 and the movable-side chuck jaw 16. The target rod 50 thermally expands in a direction of the rotation axis O while glass particles are deposited on the outer circumference thereof. When the target rod 50 thermally expands in the direction of the rotation axis O, force due to thermal expansion (referred to as thermal expansion force hereinafter) of the target rod 50 acts on the movable-side chuck block 15 and the movable-side chuck jaw 16. The movable-side chuck block 15 and the movable-side chuck jaw 16 move in a direction in which the target rod 50 elongates in the direction of the rotation axis O. At the same time, the protruding part 15a of the movable-side chuck block 15 moves inside the recessed part 14a of the axle receiving part 14 in the direction of the rotation axis O. That is, without the axle receiving part 14 moving, the movable-side chuck block 15 and the movable-side chuck jaw 16 move in the direction in which the target rod 50 elongates. A change in dimension of the target rod 50 caused by thermal expansion thereof in the direction of the rotation axis O is consequently absorbed in the horizontal lathe 1. Thus, in the horizontal lathe 1, the recessed part 14a, the protruding part 15a, and the bearing 17 form a thermal expansion absorbing mechanism that absorbs a change in dimension of the target rod 50 caused by thermal expansion thereof in the direction of the rotation axis O.

According to the horizontal lathe 1 of the first embodiment of the present disclosure, even when the target rod 50 is elongated by the thermal extension along a direction of the rotation axis O when heated, an elongated portion of the target rod 50 due to the extension may be absorbed by the recessed part 14a of the axle receiving part 14. Thus, the target rod 50 can be prevented from undergoing whirling by elongating and then warping. Therefore, even when glass particles are deposited with the target rod 50 rotated about the rotation axis O, the amplitude of the target rod 50 can be made smaller, whereby decentering of the core of an optical fiber as a final product can be prevented.

Figure 2:
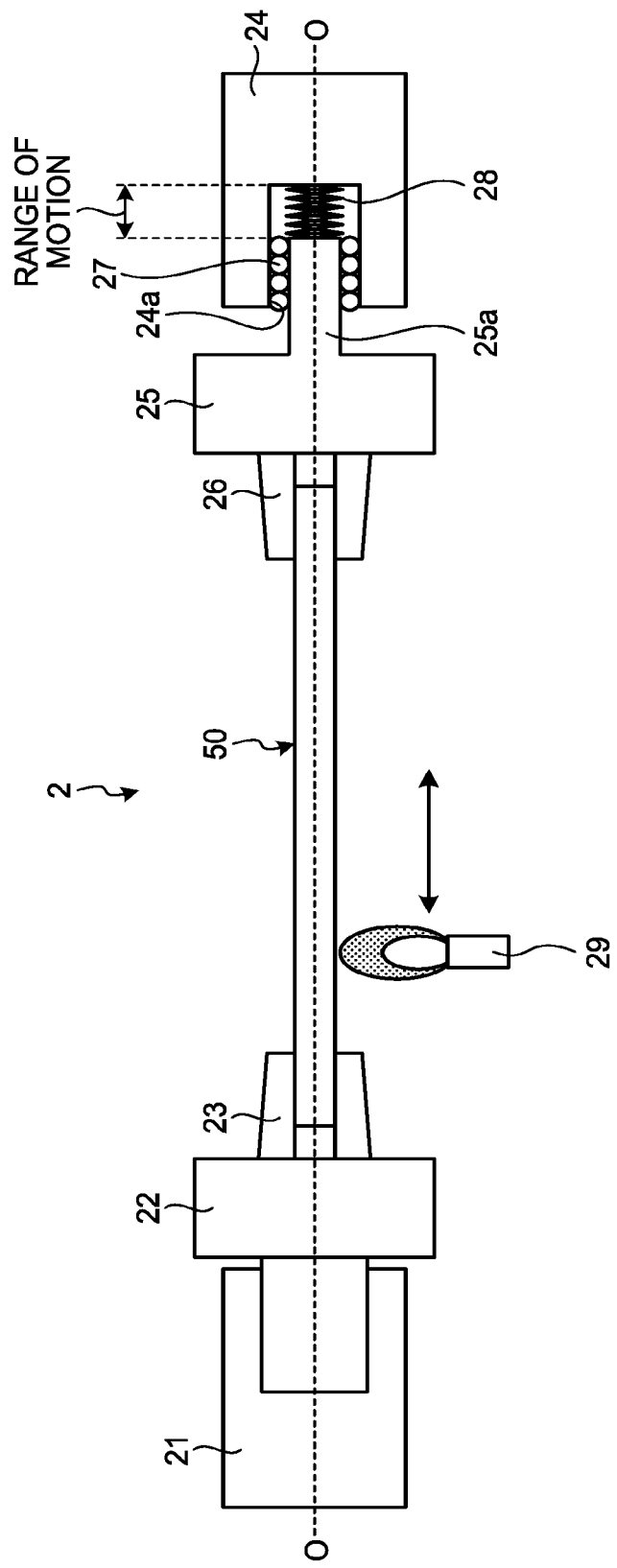
FIG. 2 is a side view illustrating a horizontal lathe according to a second embodiment of the present disclosure.

Next, a horizontal lathe for manufacturing a porous optical fiber preform according to a second embodiment of the present disclosure is described. FIG. 2 is a side view illustrating the horizontal lathe according to the second embodiment. As illustrated in FIG. 2, a horizontal lathe 2 according to the second embodiment includes a rotary motor 21, a fixed-side chuck block 22, a fixed-side chuck jaw 23, an axle receiving part 24, a movable-side chuck block 25, a movable-side chuck jaw 26, a bearing 27, and an elastic member 28. The rotary motor 21, the fixed-side chuck block 22, the fixed-side chuck jaw 23, the axle receiving part 24, the movable-side chuck block 25, the movable-side chuck jaw 26, and the bearing 27 are configured in the same manner as the rotary motor 11, the fixed-side chuck block 12, the fixed-side chuck jaw 13, the axle receiving part 14, the movable-side chuck block 15, the movable-side chuck jaw 16, and the bearing 17 according to the first embodiment, respectively. The number of oxyhydrogen burners 29 is not limited to one and can be two or more as in the case of the oxyhydrogen burner 18 according to the first embodiment.

In the horizontal lathe 2 according to the second embodiment, unlike in the one according to the first embodiment, the elastic member 28 is provided between a surface of a recessed part 24a in the axle receiving part 24, the surface facing the protruding part 25a, and a surface of a protruding part 25a in the movable-side chuck block 25, the surface facing the recessed part 24a. The surface of the recessed part 24a that faces the protruding part 25a and the surface of the protruding part 25a that faces the recessed part 24a are linked with each other by the elastic member 28. The elastic member 28 is made of, for example, a tension spring. In a range of motion of the movable-side chuck block 25, the elastic member 28 is configured to cause tensile force to act on the axle receiving part 24 and the movable-side chuck block 25 in a direction in which the elastic member 28 contracts. The length of the range of motion can be determined as appropriate in accordance with an elongated length of the target rod 50, which is to be heated, due to the thermal expansion thereof.

In the horizontal lathe 2 thus configured, an oxyhydrogen burner 29 is configured to be able to deposit glass particles on the target rod 50 by flames and be movable relatively to the horizontal lathe 2 and the target rod 50 in the direction of the rotation axis O. Instead, the horizontal lathe 2 may be configured to be movable in the direction of the rotation axis O with the oxyhydrogen burner 29 fixed in a standing-still state. That is, the oxyhydrogen burner 29 may be configured to be movable relatively to the horizontal lathe 2 in the direction of the rotation axis O. The oxyhydrogen burner 29 may be further configured as appropriate to be able to retreat to a position at which the target rod 50 is not heated.

Next, deposition of glass particles on the target rod 50 is described. The target rod 50 is heated by flames of the oxyhydrogen burner 29 while being driven by the rotary motor 21 to rotate with the respective opposite ends thereof held by the fixed-side chuck jaw 23 as a first chuck jaw and the movable-side chuck jaw 26 as a second chuck jaw. The target rod 50 thermally expands in a direction of the rotation axis O while glass particles are deposited on the outer circumference thereof. While the target rod 50 thermally expands in a direction of the rotation axis O, force acts from the elastic member 28 on the target rod 50 via the movable-side chuck block 25 and the movable-side chuck jaw 26 in a direction in which the target rod 50 expands. The movable-side chuck block 25 and the movable-side chuck jaw 26 move in a direction of the rotation axis O and in a direction in which force from the elastic member 28 acts, that is, in the direction in which the target rod 50 elongates due to the thermal expansion thereof. At the same time, the protruding part 25a of the movable-side chuck block 25 moves inside the recessed part 24a of the axle receiving part 24 in the direction of the rotation axis O. That is, without the axle receiving part 24 moving, the movable-side chuck block 25 and the movable-side chuck jaw 26 move in the direction in which the target rod 50 elongates, so that a change in dimension of the target rod 50 caused by the thermal expansion thereof in the direction of the rotation axis O is consequently absorbed in the horizontal lathe 2. Thus, in the horizontal lathe 2, the recessed part 24a, the protruding part 25a, the bearing 27, and the elastic member 28 form a thermal expansion absorbing mechanism that absorbs a change in dimension of the target rod 50 caused by the thermal expansion thereof in the direction of the rotation axis O.

According to the horizontal lathe 2 of the second embodiment of the present disclosure, even when the target rod 50 is elongated by the thermal extension along a direction of the rotation axis O when heated, an elongated length of the target rod 50 due to the extension may be absorbed into the recessed part 24a of the axle receiving part 24 by the elastic member 28. Thus, the same effect as produced by the first embodiment can be produced. Furthermore, tensile force of the elastic member 28 can alleviate warping of the target rod 50 caused by thermal expansion of the target rod 50 and therefore can prevent the target rod 50 from undergoing whirling.

Figure 3:
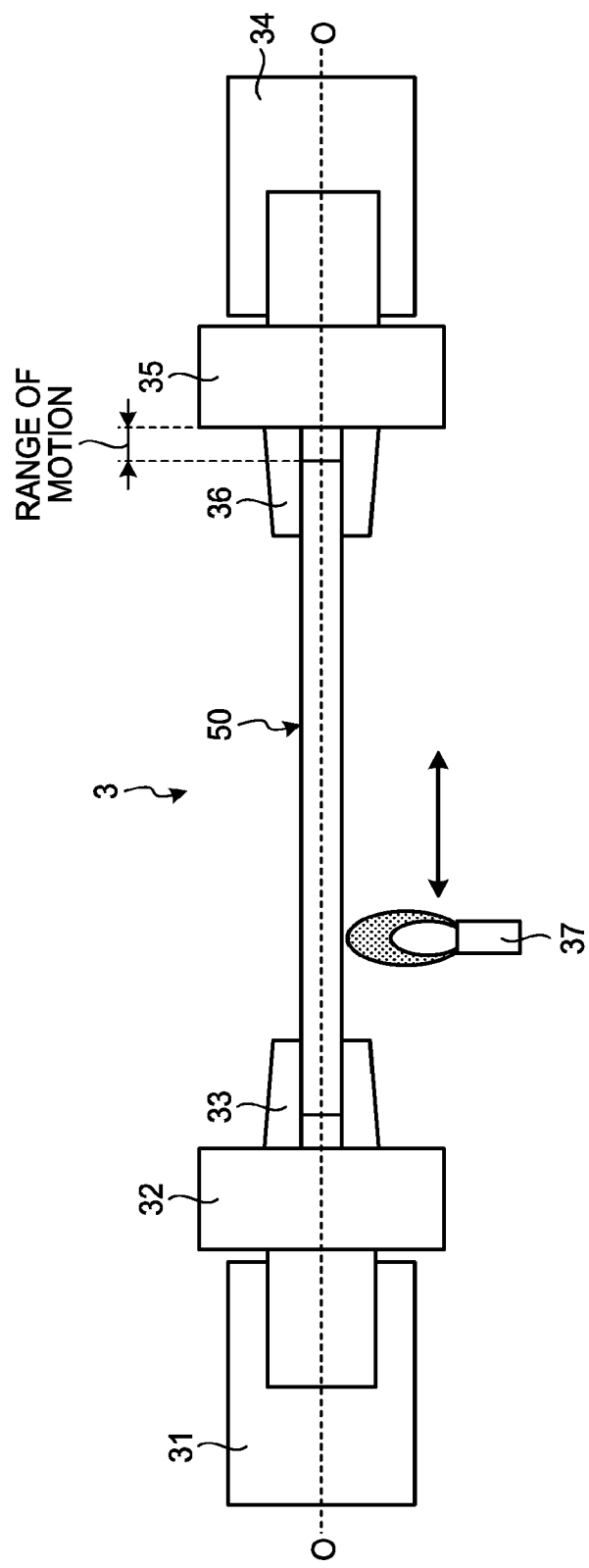
FIG. 3 is a side view illustrating a horizontal lathe according to a third embodiment of the present disclosure.

Next, a horizontal lathe for manufacturing a porous optical fiber preform according to a third embodiment of the present disclosure is described. FIG. 3 is a side view illustrating the horizontal lathe according to the third embodiment. As illustrated in FIG. 3, a horizontal lathe 3 according to the third embodiment includes a rotary motor 31, a fixed-side chuck block 32, a fixed-side chuck jaw 33, an absorption-side axle receiving part 34, an absorption-side chuck block 35, and an absorption-side chuck jaw 36. The rotary motor 31, the fixed-side chuck block 32, and the fixed-side chuck jaw 33 as a first chuck jaw are configured in the same manner as the rotary motor 11, the fixed-side chuck block 12, and the fixed-side chuck jaw 13 according to the first embodiment, respectively. The number of oxyhydrogen burners 37 is not limited to one and can be two or more as in the case of the oxyhydrogen burner 18 according to the first embodiment.

In the horizontal lathe 3 according to the third embodiment, unlike in the one according to the first embodiment, the absorption-side axle receiving part 34 is configured to enable the absorption-side chuck block 35, to which the absorption-side chuck jaw 36 is fixed, to rotate about the rotation axis O of the target rod 50. Thus, when the rotary motor 31 is rotated with the respective opposite ends of the target rod 50 held by the fixed-side chuck jaw 33 and the absorption-side chuck jaw 36, the target rod 50 can be rotated about the rotation axis O.

Of the absorption-side chuck jaw 36 as a second chuck jaw, at least a portion that makes contact with the target rod 50 is made of a material that exhibits a low coefficient of friction. The material that exhibits a low coefficient of friction is a material such that frictional force generated against the target rod 50 can be smaller than thermal expansion force of the target rod 50 even when force (work pressing force) caused by the absorption-side chuck jaw 36 to put pressure on the target rod 50 is set to force such that the target rod 50 does not jounce. A material having a low coefficient of friction is, specifically, soft steel that exhibits a coefficient of friction of 0.51 against the target rod 50 or fluororesin such as polytetrafluoroethylene (PTFE) that exhibits a coefficient of friction of 0.1 against the target rod 50. As the work pressing force, any one from various ranges can be set in accordance with the frictional force generated between the absorption-side chuck jaw 36 and the target rod 50. Alternatively, in the fixed-side chuck jaw 33 instead of the absorption-side chuck jaw 36, at least a portion that makes contact with the target rod 50 may be made of a material that exhibits a low coefficient of friction. Alternatively, in both of the fixed-side chuck jaw 33 and the absorption-side chuck jaw 36, portions that make contact with the target rod 50 may be made of materials that exhibit low coefficients of friction.

Next, deposition of glass particles on the target rod 50 is described. The target rod 50 is heated by flames of the oxyhydrogen burner 37 while being driven by the rotary motor 31 to rotate with the respective opposite ends of the target rod 50 held by the fixed-side chuck jaw 33 and the absorption-side chuck jaw 36. The target rod 50 thermally expands in a direction of the rotation axis O while glass particles are deposited on the outer circumference thereof. When the target rod 50 thermally expands in the direction of the rotation axis O, the thermal expansion force of the target rod 50 acts on the fixed-side chuck jaw 33 and the absorption-side chuck jaw 36. When the absorption-side chuck jaw 36 is caused to hold one of the opposite ends of the target rod 50, a range of motion that is larger than a size of thermal expansion of the target rod 50 is secured between an end of a holding portion of the absorption-side chuck jaw 36 and an end of a held portion of the target rod 50. The target rod 50 is held by the absorption-side chuck jaw 36 with holding force that is of a magnitude whereby changes in direction of rotation is prevented and that causes a portion of the target rod 50 that makes contact with the absorption-side chuck jaw 36 to exhibit a frictional force smaller than the thermal expansion force thereof. For this reason, while the target rod 50 elongates in a direction in which it expands, a portion thereof that makes contact with the absorption-side chuck jaw 36 slides. That is, an elongated portion of the target rod 50 stays within the range of motion in the absorption-side chuck jaw 36 without the absorption-side axle receiving part 34 moving. That is, a change in dimension of the target rod 50 caused by thermal expansion of the target rod 50 in the direction of the rotation axis O is absorbed in the horizontal lathe 3. Thus, in the horizontal lathe 3, the absorption-side chuck jaw 36 forms a thermal expansion absorbing mechanism that absorbs a change in dimension of the target rod 50 caused by thermal expansion of the target rod 50 in the direction of the rotation axis O.

EXAMPLES

Figure 4:
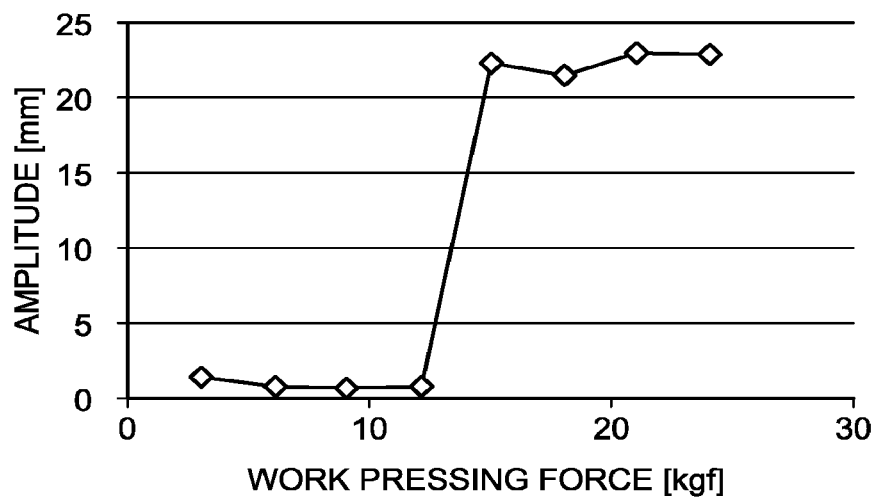
FIG. 4 is a graph illustrating the amplitude of a target rod versus work pressing force in a first example obtained by using soft steel for an absorption-side chuck jaw in the horizontal lathe according to the third embodiment of the present disclosure.
Figure 5:
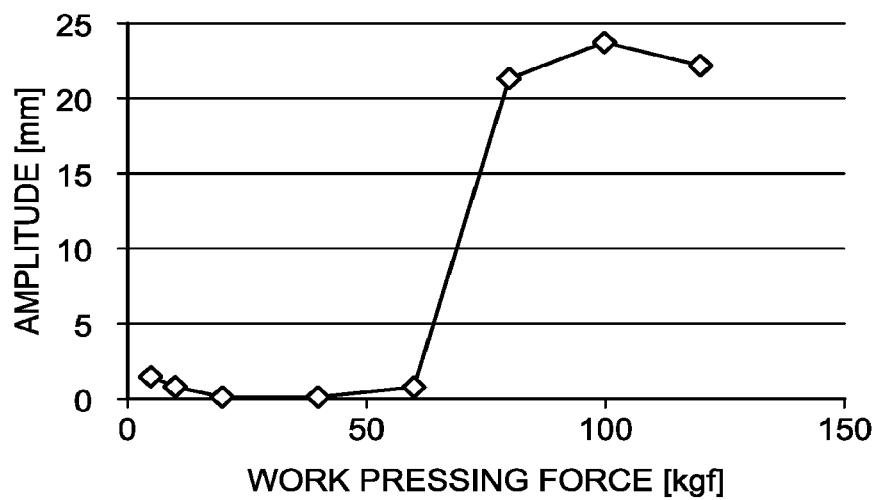
FIG. 5 is a graph illustrating the amplitude of a target rod versus work pressing force in a second example obtained by using fluororesin for an absorption-side chuck jaw in the horizontal lathe according to the third embodiment of the present disclosure.
Figure 6:
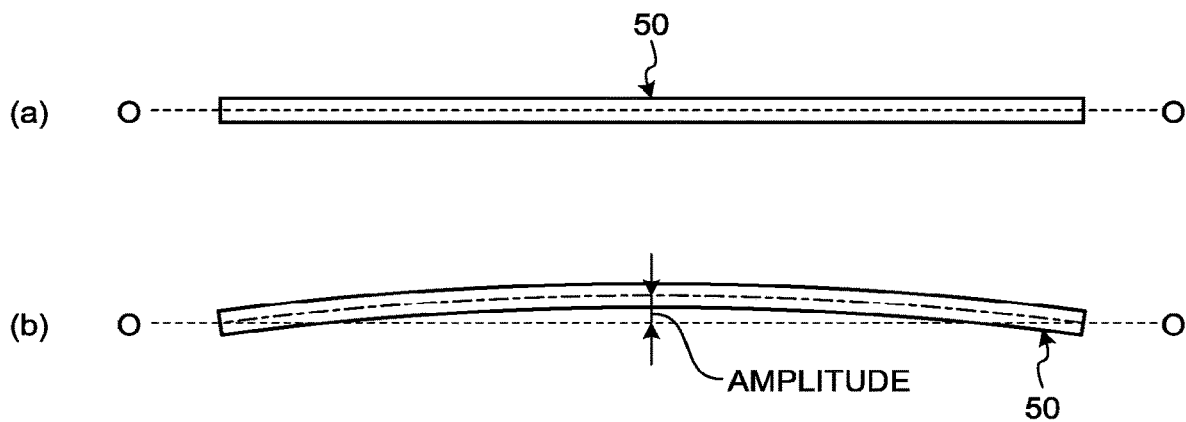
FIG. 6 is a schematic diagram for explaining the amplitude of a target rod.

Next, examples of the horizontal lathe 3 according to the third embodiment are described. In a first example, soft steel was used as the material that: exhibits a low coefficient of friction forming at least a potion in the absorption-side chuck jaw 36 that makes contact with the target rod 50; and exhibits a low coefficient of friction. FIG. 4 is a graph illustrating the amplitude of the target rod 50 versus work pressing force in the first example in which soft steel was used for the absorption-side chuck jaw 36 in the horizontal lathe 3 according to the third embodiment of the present disclosure. In a second example, fluororesin was used as the material that: exhibits a low coefficient of friction forming at least a potion in the absorption-side chuck jaw 36 that makes contact with the target rod 50; and exhibits a low coefficient of friction. FIG. 5 is a graph illustrating the amplitude of the target rod 50 versus work pressing force in the second example in which fluororesin was used for the absorption-side chuck jaw 36 in the horizontal lathe 3 according to the third embodiment of the present disclosure. In these examples, the target rod 50 was made of quartz glass. FIG. 6 is a schematic diagram for explaining the amplitude of the target rod 50. As illustrated in FIG. 6, the amplitude of the target rod 50 means the maximum displacement (mm) of the target rod 50 from the rotation axis O in a state in which it was warping outward, that is, undergoing what is called whirling as illustrated in FIG. 6(b), as compared with the target rod 50 in a normal state in which it was parallel to the rotation axis O as illustrated in FIG. 6(a).

As illustrated in FIG. 4, it was found that, when the work pressing force of the absorption-side chuck jaw 36 was increased from 3 kgf to exceed 12 kgf, the amplitude of the target rod 50 increased significantly as compared with when the work pressing force was equal to or less than 12 kgf. This is because, when the work pressing force of the absorption-side chuck jaw 36 exceeds 12 kgf, the maximum static frictional force between the absorption-side chuck jaw 36 and the target rod 50 exceeds the thermal expansion force of the target rod 50, which makes it impossible to absorb an elongated portion of the target rod 50. That is, when a portion of the absorption-side chuck jaw 36 that makes contact with the target rod 50 is made of soft steel, an elongated length of the target rod 50 due to the thermal expansion thereof can be absorbed by the horizontal lathe 3 with the work pressing force set to equal to or less than 12 kgf, which is given as a predetermined value. Under this condition, changes in direction of rotation of the target rod 50 can be suppressed with the work pressing force set to equal to or greater than 3 kgf, preferably, equal to or greater than 6 kgf.

As illustrated in FIG. 5, it was also found that, when the work pressing force of the absorption-side chuck jaw 36 was increased from 5 kgf to exceed 64 kgf, the amplitude of the target rod 50 increased significantly as compared with when the work pressing force was equal to or less than 64 kgf. This is because, when the work pressing force of the absorption-side chuck jaw 36 exceeds 64 kgf, the maximum static frictional force between the absorption-side chuck jaw 36 and the target rod 50 exceeds the thermal expansion force of the target rod 50, which makes it impossible to absorb an elongated portion of the target rod 50. That is, when the portion that makes contact with the target rod 50 is made of fluororesin such as PTFE in the absorption-side chuck jaw 36, an elongated length of the target rod 50 due to the thermal expansion thereof can be absorbed by the horizontal lathe 3 with the work pressing force set to equal to or less than 64 kgf, which is given as a predetermined value. Under this condition, changes in direction of rotation of the target rod 50 can be minimized with the work pressing force set to equal to or greater than 5 kgf, preferably, equal to or greater than 20 kgf.

With a horizontal lathe according to the present disclosure that fixes a target while holding it such that a longitudinal direction thereof is the horizontal direction, decentering of the core of an optical fiber can be prevented by preventing the target from undergoing whirling caused by thermal expansion of the target in an axial direction thereof when the target is heated.

While the embodiments of the present disclosure have been described above, the present disclosure shall not be limited to the above-described embodiments, and various modifications based on the technical concept of the present disclosure can be made. For example, the values cited in the above-described embodiments are merely examples, and values different therefrom may be used as needed.

What is claimed is:

1. A horizontal lathe for manufacturing a porous optical fiber preform, the horizontal lathe being configured to hold two opposite ends of a target in such a manner that a longitudinal direction of the target is a substantially horizontal direction, and cause the target to be rotated around an axis parallel to the longitudinal direction thereof as a rotation axis, the horizontal lathe comprising:
   a first chuck jaw configured to hold one end of a target and be rotatable about the rotation axis;
   a second chuck jaw configured to hold another end of the target and be rotatable about the rotation axis;
   a chuck block fixed to the second chuck jaw, the chuck block having a protruding part provided on one side thereof that is opposite to another side thereof to which the second chuck jaw is fixed;
   an axle receiving part including a recessed part, the recessed part configured to allow the protruding part of the chuck block to move therewithin;
   a spring that links a surface of the protruding part that faces the recessed part with a surface of the recessed part that faces the protruding part; and
   a bearing provided between an inner circumferential surface of the recessed part of the axle receiving part and an outer circumferential surface of the protruding part of the chuck block, the bearing configured to allow the second chuck jaw and the chuck block to move in a range of motion that spans between the surface of the recessed part that faces the protruding part and the surface of the protruding part that faces the recessed part,
   wherein the recessed part, the protruding part and the bearing form a thermal expansion absorbing mechanism that absorbs a change in dimension of the target, the change being due to thermal expansion of the target in a direction of the rotation axis.

2. The horizontal lathe according to claim 1, wherein the spring is a tension spring that is configured to cause tensile force to act on the axle receiving part and the chuck block in a direction in which the tension spring contracts.

* * * * *